(12) United States Patent
Hazim et al.

(10) Patent No.: US 10,450,140 B2
(45) Date of Patent: Oct. 22, 2019

(54) FORCE TRANSMISSION BELT

(71) Applicant: ARNTZ BETEILIGUNGS GMBH & CO. KG, Hoexter (DE)

(72) Inventors: Salem Hazim, Hoexter (DE); Michael Giessmann, Hoexter (DE)

(73) Assignee: ARNTZ BETEILIGUNGS GMBH & CO. KG, Hoexter (DE)

( * ) Notice: Subject to any disclaimer, the term of this patent is extended or adjusted under 35 U.S.C. 154(b) by 337 days.

(21) Appl. No.: 15/503,771

(22) PCT Filed: Aug. 19, 2015

(86) PCT No.: PCT/DE2015/000419
§ 371 (c)(1),
(2) Date: Feb. 14, 2017

(87) PCT Pub. No.: WO2016/026480
PCT Pub. Date: Feb. 25, 2016

(65) Prior Publication Data
US 2018/0229934 A1   Aug. 16, 2018

(30) Foreign Application Priority Data
Aug. 20, 2014   (DE) .......................... 10 2014 012 189

(51) Int. Cl.
*B65G 15/32* (2006.01)
*F16G 1/08* (2006.01)
*F16G 1/28* (2006.01)
*F16G 5/06* (2006.01)
(Continued)

(52) U.S. Cl.
CPC ............... *B65G 15/32* (2013.01); *F16G 1/04* (2013.01); *F16G 1/08* (2013.01); *F16G 1/28* (2013.01); *F16G 5/06* (2013.01); *F16G 5/20* (2013.01)

(58) Field of Classification Search
CPC ... B65G 15/32; F16G 1/04; F16G 1/08; F16G 1/28; F16G 5/06; F16G 5/20
See application file for complete search history.

(56) References Cited

U.S. PATENT DOCUMENTS 6,832,968 B2   12/2004   Swope
7,335,122 B2   2/2008   Swope
(Continued)

FOREIGN PATENT DOCUMENTS

CN   1535363 A   10/2004
CN   101131194 A   2/2008
(Continued)

*Primary Examiner* — William E Dondero
*Assistant Examiner* — Robert T Reese
(74) *Attorney, Agent, or Firm* — W&C IP

(57) ABSTRACT

The invention relates to a force transmission belt, formed of at least one belt material (2) having a belt longitudinal direction and having a belt width extending transversely to the belt longitudinal direction, containing a belt back (1), a tension-bearing element zone (3) having a plurality of tension-bearing elements arranged adjacent to each other over the belt width at a distance and parallel to each other, and a force transmission zone (6) adjoining the tension-bearing element zone (3). Said force transmission belt can be formed simply, economically, and with improved running properties in that the tension-bearing elements are formed by at least two narrow strips (4) of a pre-stretched plastic material, which strips are arranged adjacent to each other over the belt width and are spaced apart from each other by belt material (2).

9 Claims, 2 Drawing Sheets

Figure 1:
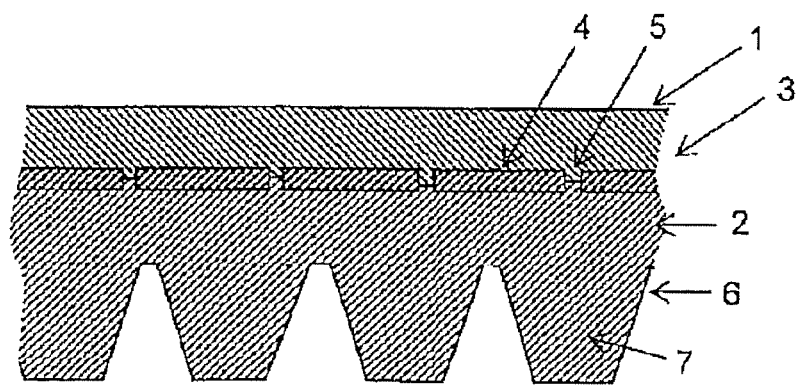

(51) Int. Cl.
*F16G 5/20* (2006.01)
*F16G 1/04* (2006.01)

(56) References Cited

U.S. PATENT DOCUMENTS

| | | | |
|---|---|---|---|
| 2008/0125263 A1 | 5/2008 | Belik | |
| 2009/0029818 A1* | 1/2009 | Takahashi | F16G 1/08 474/263 |
| 2012/0165145 A1* | 6/2012 | Kitano | B65G 15/32 474/264 |
| 2013/0240332 A1 | 9/2013 | Belik | |
| 2014/0017429 A1* | 1/2014 | Kasazaki | C08L 23/0869 428/36.4 |

FOREIGN PATENT DOCUMENTS

| | | | |
|---|---|---|---|
| CN | 101187411 A | 5/2008 | |
| DE | 316255 | 11/1919 | |
| DE | 35456 A1 | 3/1965 | |
| DE | 102006025562 A1 | 12/2007 | |
| DE | 102009005093 A1 | 9/2009 | |
| DE | 10 2013 101 252 A1 | 8/2014 | |
| EP | 166963 A2 | 1/1986 | |
| EP | 1439322 A2 | 7/2004 | |
| EP | 1547960 A2 | 6/2005 | |
| EP | 1 669 635 A1 | 6/2006 | |
| EP | 166963 A1 | 6/2006 | |
| EP | 1 930 622 B1 | 3/2012 | |
| EP | 2 765 333 A1 | 8/2014 | |
| EP | 2765333 A1 | 8/2014 | |
| EP | 2765333 A1 * | 8/2014 | F16G 1/08 |
| GB | 958256 | 5/1954 | |
| GB | 958256 A | 5/1964 | |
| WO | 92/10694 A1 | 6/1992 | |
| WO | 97/21938 A1 | 6/1997 | |
| WO | 2012/025278 A1 | 6/2011 | |

* cited by examiner

FORCE TRANSMISSION BELT

The invention relates to a power transmission belt formed of at least one belt material with a lengthwise belt direction and a belt width extending transversely thereof, comprising a belt backing, a tension member zone with a plurality of tension members arranged spacedly adjacent one another and parallel to one another over the belt width, and a power transmission zone adjoining the tension member zone.

The power transmission belts in question in the case of the present invention may consist of any desired known belt material, for example of a rubber elastomer, polyvinyl chloride, polyurethane or the like. The belt material does not have to be uniform in this respect. It is known to construct the belt material facing towards the belt backing and surrounding the tension member zone differently from the belt material in the power transmission zone. The belt backing may in this case be formed of the belt material itself but preferably consists of a layer applied to the belt material. This layer may be a textile layer, or indeed a coating of a plastics material. The layer may serve in particular to stabilize the belt and improve wear characteristics.

The tension members arranged in the tension member zone in the power transmission belt conventionally consist, in conventional power transmission belts, of a wire-form material inserted into the belt material prior to crosslinking/vulcanization thereof. The wire-form material may consist of steel or of a plastics material which is at most only slightly extensible.

It is known from WO 92/10694 A1, EP 1 669 635 A1 and DE 10 2006 025 562 A1 to construct the tension member zone not from tension members arranged adjacent one another but rather from a prestretched plastics film, namely of polyamide or copolyamide, extending over the belt width. To produce a loadable joint with the belt material, bonding agent is spread over the plastics film on both sides. The continuous loading capacity of such a structure thus depends on the durability of the adhesive joint between the film and the belt material adjoining it on both sides, wherein considerable shear forces are exerted on this adhesive joint when the belt is loaded lengthwise and the tension member zone performs its predetermined function.

It is furthermore known from US 2013/0240332 A1 to construct a tension member zone on an endless flat belt by means of reinforcing fabric. In this patent, at least two reinforcing fabric layers are formed, which may be adhesively bonded together or joined together via an elastomeric layer. The reinforcing fabrics are preferably wound by spiral winding onto a winding core for the endless belt, wherein the windings lie tightly against one another and are offset from layer to layer relative to one another in overlapping manner and optionally additionally placed crosswise at opposite angles in further layers, such that the reinforcing fabric extends as an uninterrupted layer over the belt width. In this arrangement too, the loading capacity of the belt depends on the adhesive joint between the reinforcing fabric and the belt material.

In conventional power transmission belts with wire-form tension members too, the diffusion of stress between tension members and belt material represents an influencing variable which restricts the durability of the belt under continuous load.

The object of the present invention is therefore to improve a power transmission belt of the above-mentioned type in terms of the diffusion of stress within the belt under loading in conventional operation.

To achieve this object, a power transmission belt of the above-mentioned type is characterized according to the invention in that the tension members are formed by at least two narrow strips of a prestretched plastics material, which are arranged adjacent one another over the belt width and are spaced from one another by belt material.

In the power transmission belt according to the invention, the conventional wire-form tension members are thus replaced by narrow strips of a prestretched plastics material. Surprisingly, comparatively greater axial forces may then be transmitted via the tension member zone than with wire-form tension members. The strips are here completely embedded in the belt material, because the belt material extends through the spaces between the strips over the belt width, so achieving interlocking positioning of the tension member strips. The stable joint between the tension members and the belt material therefore takes the form not only of a bonded joint, but also of an interlocking joint. It is clear that, as a result of the structure according to the invention of a power transmission belt, the stresses (axial stresses) arising in the lengthwise direction of the belt are markedly lower than in the conventional structure with wire-form tension members. The reason for this would appear to be the extensive joint between the strip-form tension members and the belt material and the compensating characteristic, inherent in the extensive, strip-form tension members, for stresses arising.

The narrow strips may, but do not each have to be of the same width. According to the invention, at least two narrow strips are arranged adjacent one another over the belt width, such that at least one space is formed which is filled by belt material. It may be advantageous to arrange at least three narrow strips adjacent one another over the belt width, such that at least two spaces filled by the belt material are present. For many applications it is expedient for at least five narrow strips to be arranged adjacent one another spacedly relative to one another over the width of the belt. In all cases the strips on average have a width that is many times greater than their thickness. The ratio of width to thickness amounts preferably to 5:1 or greater, more preferably 10:1 or greater.

The belt material does not have to be uniform material. Rather, it is conventional for the belt body to consist in the region of the power transmission zone of a different material than that of the belt backing and/or in the embedding zone of the tension members. In many cases, an advantageous embodiment is one in which the dividing line between the belt material of the power transmission zone and the belt material of the belt backing extends centrally through the power transmission zone, in the present case therefore in the region of the narrow strips. In other instances of application, it may be advantageous for a belt material of an embedding zone for the tension members to adjoin the belt material of the power transmission zone, such that the embedding material completely surrounds the narrow strips of the tension member zone. A further belt material then adjoins on the belt backing side. In general, in the power transmission zone a belt material is used which meets stringent abrasion requirements, while towards the belt backing the belt material primarily has a degree of resilience and resistance to tensile stresses. If a separate embedding material is used, this may be optimized for a strong material bond with the narrow strips of the tension member zone.

The invention is relevant to all types of power transmission belts which have a tension member zone. Accordingly, the power transmission belts according to the invention may be V-belts, V-ribbed belts, toothed belts or the like.

A polyamide 6,6 film has proven particularly suitable as the material for the prestretched film used according to the invention. The strips according to the invention of the tension member zone may however advantageously also consist of polyester or a copolymer of polyester and polyamide for certain instances of application.

The strips are preferably spirally wound, if the power transmission belt is configured in the form of an endless belt. Alternatively, however, it is also possible to configure the strips arranged adjacent one another over the belt width parallel to one another in the axial direction and to make them continuous by joining the ends of the strips together. Spiral winding is, however, more efficient in manufacturing terms. As a result of spiral winding, different widths of the narrow strips arise in each case at the edges of the belt width, depending on the circumferential angle, as a result of adaptation to the width of the power transmission belt.

Both in the case of spiral winding and in the case of a continuous winding, for each narrow strip at least one space arises according to the invention between two narrow strips in the widthwise direction of the belt, said space being filled by belt material. However, at least two, preferably at least four spaces are preferred.

The strips preferably consist of a single-ply film layer, but may also consist of a plurality of film layers wound on one another, wherein the layers lying on one another are extensively joined together.

The strips preferably have a width of between 1 and 25 mm depending on the width of the belt and a weight per unit length of between 900 dtex and 80000 dtex. When the strips are constructed from a single-layer film, the weight per unit length applied for the width of the strips used is thus that of the starting film.

The structure according to the invention is possible with any suitable belt material, i.e. belt elastomer. For many instances of application, it is preferable to use a belt material consisting of a vulcanized rubber compound, wherein the rubber is preferably ethylene propylene diene terpolymer rubber (EPDM), chloroprene rubber (CR) or alkylated chlorosulfonated polyethylene (ACSM). Other belt materials, such as polyurethane and polyvinyl chloride, may likewise be used for the invention.

The invention will be explained in greater detail below with reference to an exemplary embodiment illustrated in the drawings.

Figure 2:
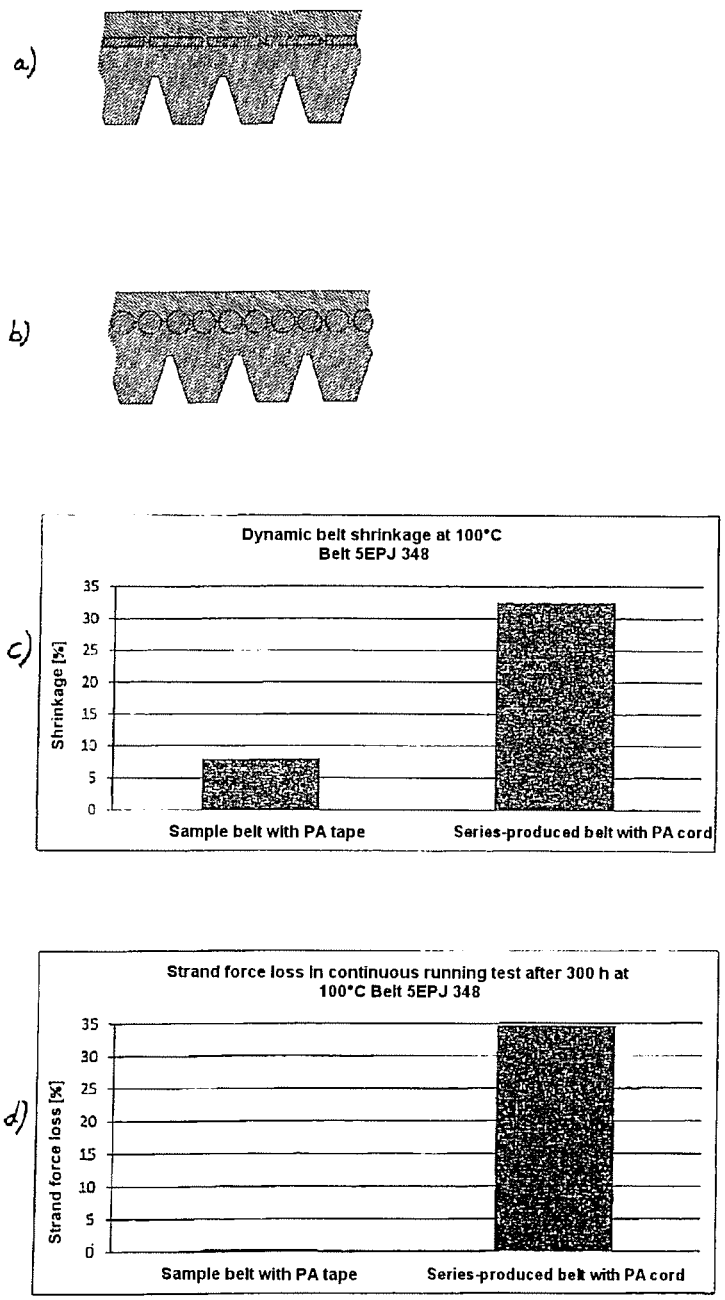

FIG. 1 shows a cross-section in the widthwise direction through a V-ribbed belt configured according to the invention, FIG. 2 depicts a comparative test in relation to dynamic belt shrinkage and strand force loss in the continuous running test between a series-produced belt with a polyamide cord and a belt according to the invention but otherwise of identical construction with a tension member layer formed of narrow strips.

The V-ribbed belt comprises a belt backing 1 in the form of a textile layer. The belt backing 1 is adjoined in the exemplary embodiment illustrated by a uniform belt material 2, which consists for example of polyurethane. At a distance from and parallel to the belt backing 1, a tension member zone 3 extends over the width of the power transmission belt discernible in the drawing. The tension member zone 3 is formed from strips 4 of a prestretched plastics film, preferably of polyamide 6,6, arranged adjacent one another over the width.

The strips 4 are each spaced 5 from one another in the widthwise direction, each space being filled by the belt material, such that the strips 4 are completely embedded in the belt material. The space 5 is smaller than the width of the strips 4. Preferably, the size of the space 5 amounts to between ½ and ⅙ of the width of the strip 4.

On the other side of the tension member zone 3 from the belt backing 1, a power transmission zone 6 begins, which, in the exemplary embodiment shown of a V-ribbed belt, forms wedge-shaped ribs 7 extending in the lengthwise direction of the belt.

Although not shown in the present exemplary embodiment, the surface of the power transmission zone 6, i.e. for example the wedge-shaped ribs 7, may be provided with an abrasion-resistant layer, for example of a textile.

In the exemplary embodiment shown, five strips 4 are provided over the width of the belt. Depending on the respective width of the power transmission belt, more or fewer strips 4 may form the tension member zone 3. What is essential here is that the ratio between space 5 and strip width 4 ensures secure embedding of the strips 4 in the belt material 2.

FIG. 2 shows schematically in depiction a) the belt structure according to the invention described in FIG. 1, compared with an otherwise identical structure of a series-produced belt made by the applicant (5EPJ 348), which however comprises a tension member zone with conventional cord wires according to depiction b).

The bar chart according to figure c) relates to the performance of belt operation over one hour and at a temperature setting of 100° C. The heat-shrinkage of the two compared belts was measured. The series-produced belt according to structure b) exhibits dynamic belt shrinkage of over 32%, while the belt according to the invention according to structure a) exhibits a dynamic belt shrinkage of approximately 8%.

A continuous running test was additionally performed over 300 hours at a temperature of 100° C. (bar chart according to figure d)). The strand force loss amounted in the series-produced belt according to b) to 34%, while in the belt according to the invention shown in a) it was undetectable and is below 1%. The belt according to the invention thus provides dynamic running characteristics which are significantly improved over conventional series-produced belts.

Furthermore, the configuration according to the invention has the advantage that the strips 4 consisting of the prestretched film are markedly cheaper and easier to apply than the conventional wire-form tension members.

The following is a complete listing of all the claims in the application, with an indication of the status of each:

1. A power transmission belt in the form of an endless belt formed of at least one belt material with a lengthwise belt direction and a belt width extending transversely thereof, comprising a belt backing, a tension member zone with a plurality of tension members arranged spacedly adjacent one another and parallel to one another over the belt width, and a power transmission zone adjoining the tension member zone, wherein the tension members are formed by at least two narrow strips of a prestretched plastics material, which are arranged adjacent one another over the belt width and are spaced from one another by belt material between ½ and ⅙ a width of a strip, wherein the two narrow strips forming the tension members are formed by spiral winding of a strip over the belt width.

2. The power transmission belt according to claim 1, wherein the two narrow strips consist of polyamide.

3. The power transmission belt of claim 2 wherein the polyamide is selected from the group consisting of polyamide 6 and polyamide 6,6.

4. The power transmission belt as claimed in claim 1, wherein the two narrow strips have a width ranging from 1 mm to 25 mm and a weight per unit length ranging from 900 dtex to 80000 dtex.

5. The power transmission belt as claimed in claim 1, wherein the material embedding the strips is the material of the power transmission zone.

6. The power transmission belt as claimed in claim 1, wherein the at least one belt material embeds the at least two narrow strips and is selected from the group consisting of a vulcanized rubber, a polyurethane and a polyvinyl chloride.

7. The power transmission belt as claimed in claim 6, wherein the belt material is vulcanized rubber, and the vulcanized rubber is selected from the group consisting of an EPDM, a CR and an ACSM rubber.

8. The power transmission belt as claimed in claim 1, wherein the at least two narrow strips comprises at least three narrow strips arranged adjacent one another over the belt width.

9. The power transmission belt as claimed in claim 1, wherein the power transmission belt is configured as a V-belt, a V-ribbed belt or a toothed belt.

* * * * *